US009609047B2

(12) United States Patent
Johnson (10) Patent No.: US 9,609,047 B2
(45) Date of Patent: Mar. 28, 2017

(54) CLOUD COMPUTING INFRASTRUCTURE (71) Applicant: Microsoft Technology Licensing, LLC, Redmond, WA (US)

(72) Inventor: Matthew Alastair Johnson, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 14/721,189

(22) Filed: May 26, 2015

(65) Prior Publication Data
US 2016/0352813 A1 Dec. 1, 2016

(51) Int. Cl.
*H04L 29/08* (2006.01)
*G06F 17/30* (2006.01)
*G06F 3/0484* (2013.01)
*H04L 29/06* (2006.01)

(52) U.S. Cl.
CPC .............. *H04L 67/10* (2013.01); *H04L 67/02* (2013.01); *H04L 67/42* (2013.01)

(58) Field of Classification Search
USPC ................................. 709/219, 213, 217, 226
See application file for complete search history.

(56) References Cited

U.S. PATENT DOCUMENTS

| 8,429,630 | B2 | 4/2013 | Nickolov et al. | |
|---|---|---|---|---|
| 8,495,611 | B2 | 7/2013 | McCarthy et al. | |
| 8,775,425 | B2 | 7/2014 | Gupta et al. | |
| 2009/0307094 | A1 | 12/2009 | Manos | |
| 2010/0042670 | A1 | 2/2010 | Kamalakantha et al. | |
| 2010/0069035 | A1* | 3/2010 | Johnson | H04W 4/02 455/404.1 |
| 2010/0257507 | A1* | 10/2010 | Warren | G06F 8/40 717/106 |
| 2011/0125740 | A1* | 5/2011 | Peters | G06F 17/30716 707/736 |

(Continued)

OTHER PUBLICATIONS

Calder, et al., "Windows Azure Storage: A Highly Available Cloud Storage Service with Strong Consistency", Proceedings of the 23rd ACM Symposium on Operating Systems Principles, Oct. 23, 2011, pp. 143-157.

(Continued)

*Primary Examiner* — Jude Jean Gilles
(74) *Attorney, Agent, or Firm* — Lee & Hayes, PLLC (57) ABSTRACT

A first node comprises a web server with a network interface configured to connect the web server to a plurality of second nodes of a cloud infrastructure. The first node has physical storage, connected to the web server, the physical storage comprising at least a master database of a multi-master database system of the cloud computing infrastructure, the master database configured to store atomic code units and data redundantly as part of the multi-master database system, the atomic code units defining the dynamic web application. The web server receives requests comprising input data and identifiers of individual ones of the atomic code units, at least some of the requests originating from client devices using the dynamic web application. The web server executes, in response to requests, individual ones of the atomic code units in dependence on state of the master database, such that the dynamic web application is executed.

20 Claims, 7 Drawing Sheets

(56) References Cited

U.S. PATENT DOCUMENTS

| | | |
|---|---|---|
| 2011/0225484 A1 | 9/2011 | Lotan-Bolotnikoff et al. |
| 2012/0290959 A1 | 11/2012 | Quine |
| 2012/0311581 A1 | 12/2012 | Balmin et al. |
| 2013/0097190 A1* | 4/2013 | Shah ............ G06F 17/30029 707/754 |
| 2013/0254755 A1* | 9/2013 | Yousouf ............ G06F 8/60 717/170 |
| 2013/0290406 A1 | 10/2013 | Calvin et al. |
| 2014/0108665 A1 | 4/2014 | Arora et al. |
| 2014/0156828 A1 | 6/2014 | Pasternak |
| 2014/0359552 A1 | 12/2014 | Misra et al. |
| 2015/0058435 A1* | 2/2015 | Chumbley ......... H04L 67/2842 709/213 |

OTHER PUBLICATIONS

Chen, et al., "Scalable Service-oriented Replication with Flexible Consistency Guarantee in the Cloud", The Journal of Informational Sciences, vol. 264, Apr. 20, 2014, pp. 349-370.

Gupta, et al., "Autonomic Fault Tolerant Framework for Web Applications", International Journal of Computer Science and Technology, vol. 4, Issue 2, Jun. 2013, pp. 528-533.

Nuaimi, et al., "A Survey of Load Balancing in Cloud Computing: Challenges and Algorithms", Proceedings of the 2012 Second Symposium on Network Cloud Computing and Applications, Dec. 3, 2012, pp. 137-142.

PCT Search Report and Written Opinion mailed Aug. 26, 2016 for PCT Application No. PCT/US2016/034207, 17 pages.

Rodriguez, A., "RESTful Web services: The basics", Proceedings of IBM Developer Works, Nov. 6, 2008, 12 pages.

Second Written Opinion mailed Nov. 3, 2016 for PCT Application No. PCT/US2016/034207, 13 pages.

Hausladen, et al., "A Cloud-based Integrated Development Environment for Embedded Systems", In Proceedings of IEEE/ASME 10th International Conference on Mechatronic and Embedded Systems and Applications, Sep. 10, 2014, 5 pages.

Zhang, Wenjun, "2-Tier Cloud Architecture with maximized RIA and SimpleDB via minimized REST", In Proceedings of 2nd International Conference on Computer Engineering and Technology, vol. 6, Apr. 16, 2010, 5 pages.

* cited by examiner

CLOUD COMPUTING INFRASTRUCTURE

BACKGROUND

Cloud computing infrastructure is increasingly complex as web applications using the cloud computing infrastructure have greater demands in terms of capacity, performance and robustness. Web service providers want their web services to be always available, despite increases in demand, and in addition, they don't want to lose data, such as data input by end users to social network pages, files uploaded by end users, sensor data, and other data.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A cloud computing infrastructure is described. In various examples the infrastructure comprises a first node supporting a dynamic web application, where the first node is in communication with a plurality of second nodes. The first node comprises a web server with a network interface configured to connect the web server to the second nodes. The first node has physical storage, connected to the web server, the physical storage comprising at least a master database of a multi-master database system of the cloud computing infrastructure, the master database configured to store atomic code units and data redundantly as part of the multi-master database system, the atomic code units defining the dynamic web application. The web server is configured to receive requests comprising input data and identifiers of individual ones of the atomic code units, at least some of the requests originating from client devices using the dynamic web application. The web server has a processor configured to execute, in response to requests, individual ones of the atomic code units in dependence on state of the master database, such that the dynamic web application is executed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Simple cloud computing infrastructure may comprise individual web servers and individual databases. This infrastructure rapidly becomes more complex as higher demands for capacity, performance and robustness are catered for. As complexity increases it is difficult for programmers who have little or no knowledge of technology in the cloud to implement cloud services in an efficient, robust manner. As complexity increases it is also difficult to scale up cloud computing infrastructure in a manner which is simple, efficient and cost effective.

The embodiments described below are not limited to implementations which solve any or all of the disadvantages of known cloud computing infrastructure.

Although the present examples are described and illustrated herein as being implemented in a cloud computing system providing a social network service, the system described is provided as an example and not a limitation. As those skilled in the art will appreciate, the present examples are suitable for cloud computing systems providing a variety of different types of dynamic web applications. A dynamic web application is typically accessed by an end user from an end user device which is in communication with a cloud computing system, and is dynamic in that text, images, audio, video, sensor data, or other data of the web application to be displayed or used at the end user device can change at a high frequency relative to other types of web applications. For example a dynamic web application can change the data to be provided in multiple second time intervals. In contrast a static web application provides web pages which change rarely.

Figure 1:
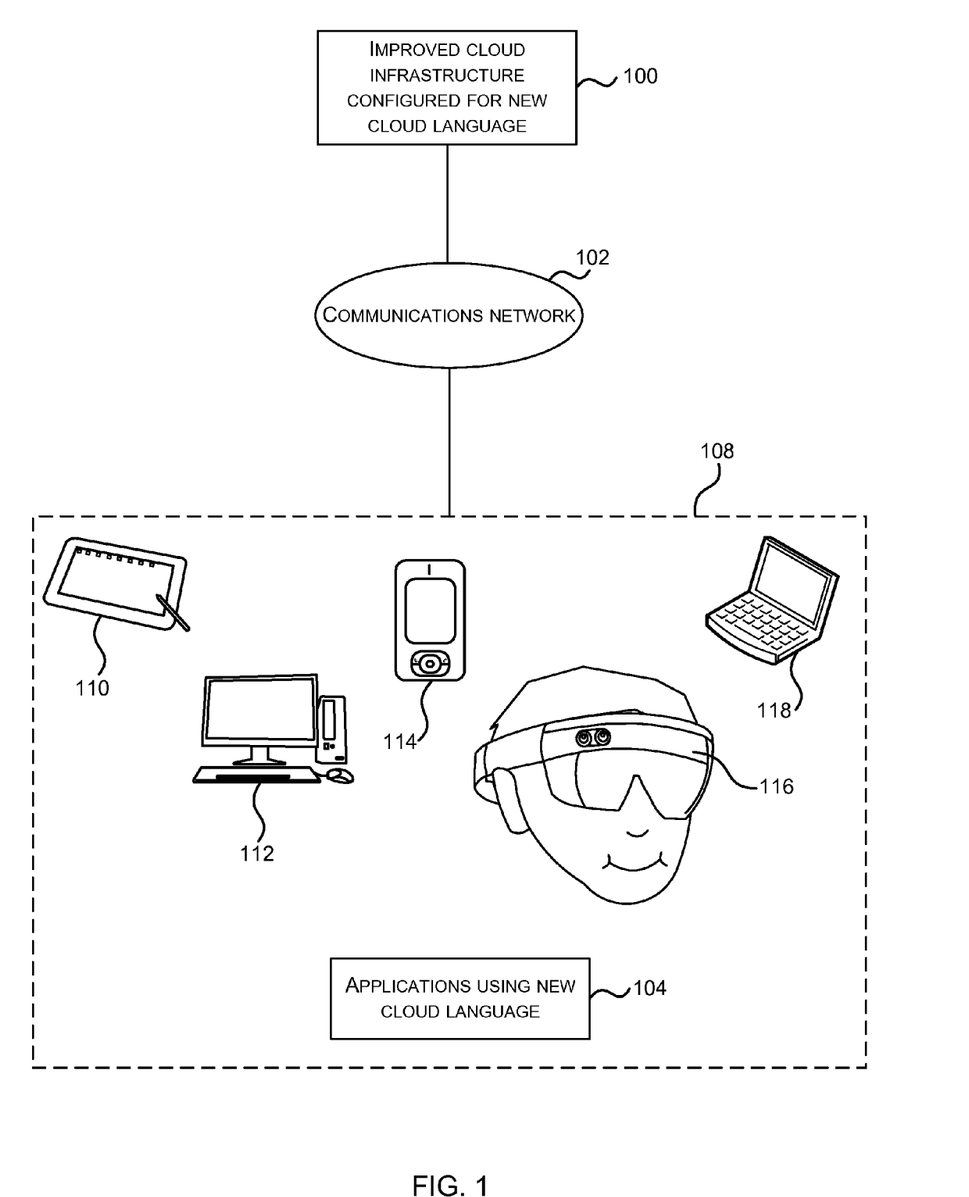
FIG. 1 is a schematic diagram of improved cloud computing infrastructure configured to use a new cloud programming language.

FIG. 1 is a schematic diagram of an improved cloud infrastructure 100 configured to operate using a new cloud programming language. For example, the cloud infrastructure receives requests from applications at client devices 108. The applications 104 make use of the new cloud programming language by generating and sending requests which trigger execution of code statements written in the new cloud programming language. The requests are sent to the cloud infrastructure 100 over a communications network 102 of any suitable type. For example, the communications network 102 may be the public internet, an enterprise intranet, or other network. More detail about the requests is given later in this document.

The cloud infrastructure may be configured to provide one or more cloud services, such as a social network, a music catalog, a file storage system, a video streaming service, a photo sharing application, a large-scale data computation architecture, a machine learning infrastructure or a wiki.

This is achieved by executing code statements at the cloud infrastructure, where the code statements are written in the new cloud programming language. The code statements comprise atomic code statements which may be executed by any of one or more individual gearboxes. A gearbox is a web server having physical storage holding a database, and optionally a file store as explained in more detail below. The web server of a gearbox provides an execution environment for gears. The gearboxes are functionally equivalent, or identical with one another so that adding more gearboxes to the cloud infrastructure is simple and gives a fast, efficient, and cost effective way of scaling the cloud infrastructure. Adding more gearboxes in this manner may be referred to as "horizontally scaling" the infrastructure. Previously it has not been possible to horizontally scale in such a simple manner because file servers, databases, and execution servers (also known as application servers) are typically different physical entities, so that a web service provider, in order to scale up his or her infrastructure to meet customer demand, needs to buy and deploy one of each type of server (file server, database, execution server) in order to scale up the infrastructure in a practical manner. For example, a web service provider needing to increase file store capacity (but not other types of capacity) may decide to buy and deploy a new file server. However, because of configuration of the cloud infrastructure previously used, the web service provider typically has to purchase and deploy one each of a new file server, database, and execution server).

Because the gearboxes are functionally equivalent, an individual gear may be executed at any of the gearboxes at the cloud infrastructure. This enables horizontal scaling as mentioned above (to either add or remove gearboxes). In addition, fault tolerance is facilitated, because if one of the gearboxes malfunctions, the other gearboxes are used so that the end user does not experience an absence of the web service. Data (which may include files) and gears are redundantly stored over the plurality of gearboxes so that if one gearbox fails or is removed, the end user does not experience data loss and currently running gears are not impacted (within a reasonable tolerance).

A plurality of gears are written by a programmer, in the new programming language, to create a web service and the plurality of gears are stored at the cloud infrastructure (as described in more detail below). A gear is an atomic code statement which receives input and executes a unit of work to generate output. A gear is immutable. A gear can generate other gears and can trigger execution of other gears. A gear is a code statement which is suitable for being readily distributed amongst a plurality of nodes (gearboxes), so that individual ones of the nodes have copies of the same gear and are able to execute that gear to achieve the same result. Requests (which comprise an identifier of a gear formed in the new programming language) are sent to the web service at the cloud infrastructure, from client devices. For example, to update a post at a social network. When a request is received it triggers execution of a gear at the cloud infrastructure, in dependence on state from the physical storage, which in turn can trigger execution of another gear and so on. Output data generated by the cloud infrastructure as a result of the request is returned to the client device. For example, the updated social network post. The output data is cacheable and each gearbox operates a cache process, whereby it checks its local cache, so that popular requests do not need to be executed each time they are received, saving execution load. In various examples, consistent hashing is used to improve efficiency whereby the request is hashed and the hash code is used to select a gearbox to handle the request. This is described in more detail later in this document. A consistent hashing scheme is one in which only k/n keys need to be remapped on average, when a hash table is resized (where k is the number of keys and n is the number of slots). Because an individual gearbox has its own physical store comprising a database and (where used) a file store, which are part of a multi-master database and a multi-master file store (where a file store is used), the individual gearbox knows when changes to data and/or files have been made. That is, the individual gearbox is able to tell when it is safe to use the cached data and when not by checking its physical store.

A programmer using the new programming language is able to achieve effective redundancy and robustness without the need to have detailed knowledge of software and hardware for achieving redundancy and robustness. This is achieved by configuring individual gearboxes to have physical storage which is part of a multi-master database system and optionally also part of a multi-master file storage system. In addition, scaling up is facilitated, because when a new gearbox is added, its physical storage becomes part of the existing multi-master database system, so there is no need to re-configure the existing cloud infrastructure. As a result of using a multi-master database system (and a multi-master file storage system in some examples) the data in a gearbox, both in the physical store and in memory, is eventually consistent. This means that different copies of the data can, at any point in time, be out of synchronization with each other based upon their current message state, but eventually those different copies will become consistent. An individual gearbox is a master of a multi-master database system. Where a file storage system is provided, an individual gearbox is a master of a multi-master file storage system. A multi-master database system (also referred to as a database system using multi-master replication) comprises a plurality of databases which together store a body of data, where any member of the group of databases is allowed to update the data, and where any member of the group of databases is responsive to client data queries. A multi-master database system has a mechanism for propagating data modifications made by one of the databases, to the other databases in the group, and for resolving any conflicts arising from concurrent changes made by different individual databases of the group. Thus data stored at an individual database of a multi-master database system is eventually consistent with other copies of that data at other individual databases in the group, rather than being guaranteed to always be consistent. In the case that a file storage system is implemented, each individual gearbox is a master of a multi-master file storage system. A multi-master file storage system is the same as a multi-master database system, except that it stores files. In some examples, where databases and/or files are configured in a suitable manner, a database may store files, so that a multi-master database system and a multi-master file storage system can be integral The new programming language "understands" the multi-master database system, multi-master file system (where used) and execution platform provided by the gearboxes of the cloud infrastructure. This is because when gears are executed they are able to make calls into application programming interfaces of the multi-master database system, file system (where used) and execution system.

A programmer using the new programming language is able to achieve effective load balancing without the need to have detailed knowledge of software and hardware for achieving redundancy and robustness. This is achieved by configuring individual gearboxes to receive requests from a shared round robin load balancer. In addition, scaling up is facilitated, because when a new gearbox is added, it is connected to the shared round robin load balancer so that load balancing takes into account the newly added gearbox in a simple and effective manner without the need to make significant changes to the existing cloud infrastructure. This is achieved without the need for load balancing software to be used at clusters of gearboxes in addition to the single round robin load balancer, even when hundreds or more of gearboxes are used. Load balancing software is notoriously error prone and difficult to use. Load balancing is achieved without the need for a complex, expensive, hardware load balancer (which is not a round robin load balancer) to be used as is typically the case for multi-master database cloud infrastructure deployments. Typically, round robin load balancers cannot be used for large scale cloud computing deployments having hundreds of web servers because of the need to maintain consistent state over a session. Once a session has begun in which subsequent requests to the cloud computing architecture necessarily depend upon intermediary state produces as a result of fulfilling previous requests, subsequent requests to the cloud computing architecture must be sent to individual instances which have access to that intermediary state, which in practice requires sending those requests back to the exact same instance as was used to fulfill the initial request. Thus, a session identifier of some kind is included with the requests to enable a load balancer to send subsequent requests for the session to the same machine, requiring in most cases complex routing logic to be maintained by the load balancer at all times to ensure that requests "stick" to the same instance.

A programmer using the new programming language is guided by the language itself into creating gears which are appropriate for use with clusters of individual gearboxes so that the individual gearboxes are horizontally scalable.

The client devices 108 may be tablet computers 110, desktop computers 112, smart phones 114, wearable computers 116, laptop computers 118 or other end user computing equipment which is able to communicate with a cloud computing service over a communications network 102.

The new programming language may be built on top of a software framework so that another programming language of that software framework is configured to take some of the burden of making the new programming language work on a massively scalable cloud architecture.

Figure 2:
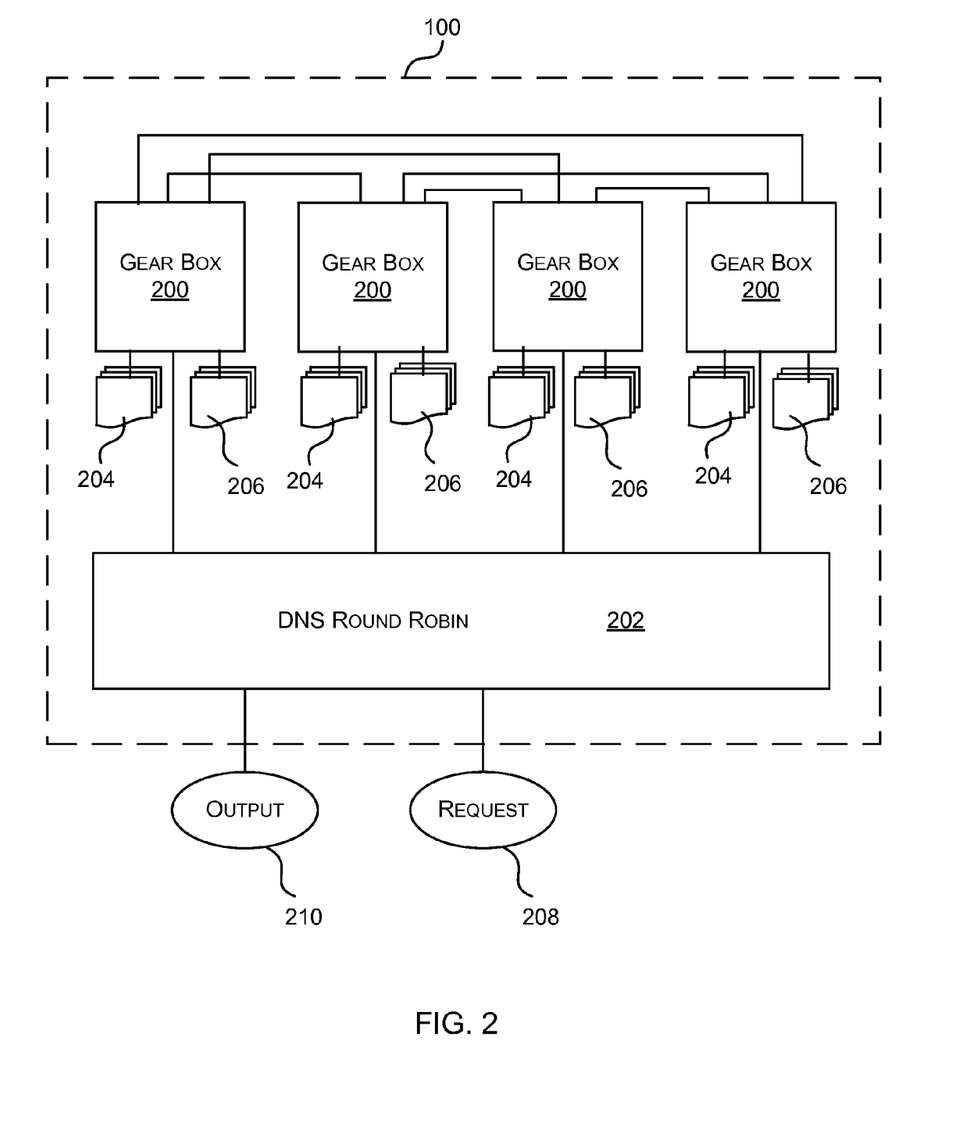
FIG. 2 is a schematic diagram of an example of the improved cloud computing infrastructure of FIG. 1 in more detail.

FIG. 2 is a schematic diagram of an example of the improved cloud computing infrastructure 100 of FIG. 1 in more detail. The infrastructure comprises a plurality of gearboxes 200 connected to one another via any suitable interconnect. In the FIG. 2 drawing, lines between the gearboxes represent the interconnect. In practice, a group of gearboxes may be on the same subnet and the interconnect, or network infrastructure, may comprise one or more switches connected to one or more routers, along with one or more name servers to translate names into addresses. In the example of FIG. 2 the gearboxes are at the same geographical location, but this is not essential. The gearboxes may be remotely distributed from one another.

Each gearbox has access to one or more media items 206 such as videos, digital images, audio content, and other media items. Each gearbox has access to one or more text items 204.

Each gearbox is in communication with a round robin load balancer 202. A round robin load balancer is a mechanism for allocating incoming requests to individual ones of a plurality of nodes. A round robin load balancer takes a list of nodes and allocates the incoming request to the first node in the list and then permutes the list, so the node which was at the top of the list moves to the bottom of the list and the other nodes each move up one place in the list. The next incoming request is allocated to the first node in the list and the list is permuted again. A DNS (Domain Name System) round robin is a mechanism that allocates DNS requests to individual ones of a plurality of web servers using the round robin mechanism mentioned above. A round robin load balancer may remove a node from the list if it receives information indicating that the node has failed or is not responding. A round robin load balancer is horizontally scalable, in that additional round robin load balancers can be added, where each round robin load balancer maintains its own list representing a subset of gearboxes such that all load balancers together span the entire set of available gearboxes. FIG. 2 shows a single round robin load balancer although in practice several may be used. As a result of using a round robin load balancer, the plurality of gearboxes can be considered as a ring of gearboxes, even though they are not necessarily connected in a physical ring structure.

The cloud infrastructure 100 receives requests from client devices, such as request 208. For example, a request is written in the new cloud programming language and comprises an identifier of a gear, and input data in the form of a string. A non-exhaustive list of examples of input data which may be represented using a string is: sensor data, text, images, audio, structured metadata, executable code, Uniform Resource Identifiers (URIs), and Base 64 encoded binary data. More detail about process at a gearbox when a request is received is given below with respect to FIG. 4.

The cloud infrastructure 100 generates, in response to requests such as request 208, output data 210 which is sent to one or more of the client devices.

It is possible to use the round robin load balancer without any additional complex load balancer because the problem of providing sticky sessions is overcome by having gearboxes. This is because any of the gearboxes can execute any gear. When a web session is underway between a client device and the cloud infrastructure, the web session typically involves many requests sent from the client to the cloud infrastructure over the duration of the session. The requests are dealt with by different ones of the gearboxes depending on which gearbox is allocated which request by the round robin load balancer. Because each gearbox is able to execute each gear, and because each gearbox is a master of the multi-master database system (and optionally file storage system) the outputs to the client device are correct and take into account previous work done by others of the gearboxes during the session. Many previous cloud infrastructure systems have relied on using cookies from a client device to ensure that the same web server, of a cluster of web servers, always deals with requests in the client-web server session. Using cookies for so called "sticky sessioning" is not needed due to the configuration of the gearboxes.

Figure 3:
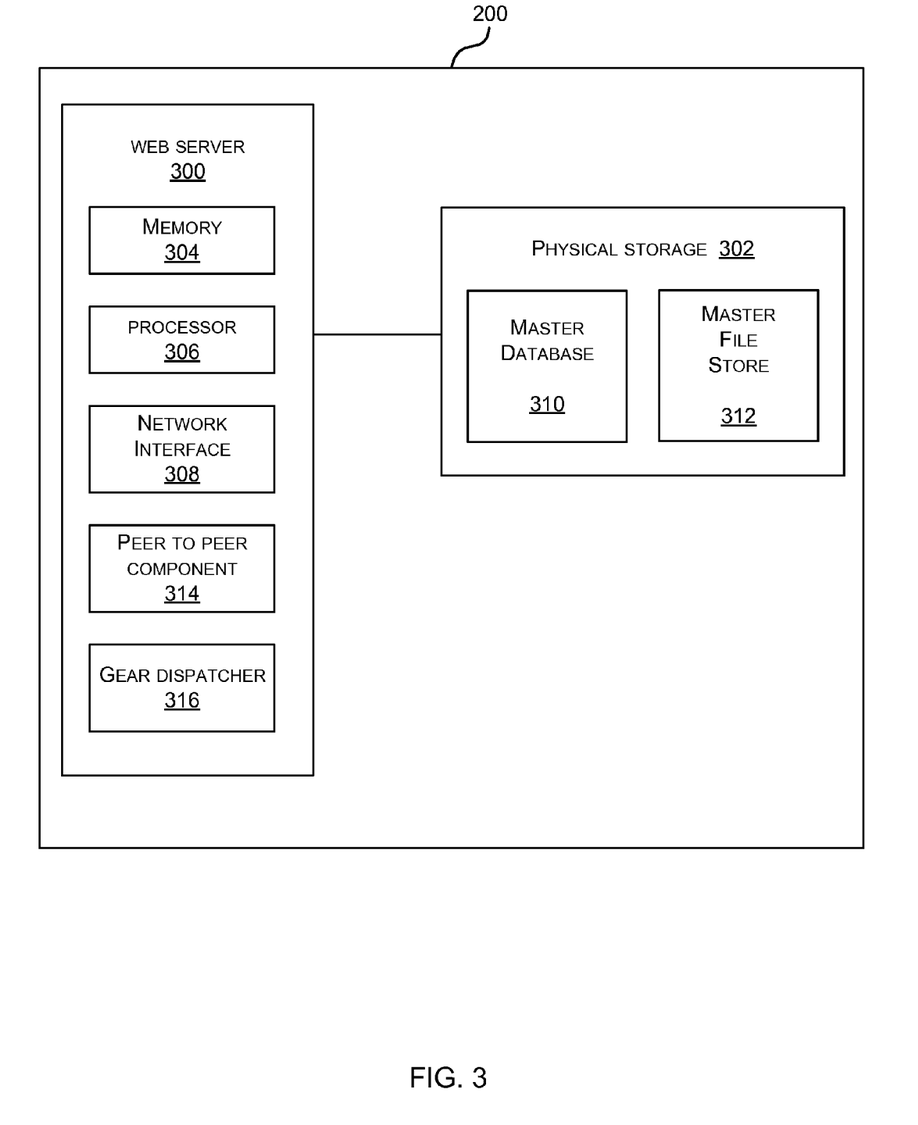
FIG. 3 is a schematic diagram of a single gearbox, comprising a web server with physical storage.

FIG. 3 is a schematic diagram of a gearbox 200 in more detail. A gearbox comprises a web server 300 which has a memory 304, a processor 306, a network interface 308, a peer to peer component 314 and a gear dispatcher 316. The web server 300 may be a physical computing device or may be provided as a virtual machine. The network interface is configured to enable the web server 300 to communicate with other gearboxes 200 and also with the round robin load balancer. The web server 300 is connected to physical storage 302 comprising a master database 310 and optionally a master file store 312. The master database 310 is part of a multi-master database system formed from a plurality of gearboxes as described above. The master database 310 knows about the other master databases through use of the peer to peer component 314. In a similar manner the master file store 312 is part of a multi-master file store formed from a plurality of gearboxes. In some examples there is no multi-master file store and the master database 310 is arranged to store data in the form of files as well as in other conventional forms.

The memory comprises a cache used to hold output data which results from executing gears. The use of the cache is described in more detail with reference to FIG. 4.

The gearbox 200 is part of a peer to peer network comprising the other gearboxes of the cloud infrastructure 100. Each gearbox has a peer to peer component 314 which enables that gearbox to advertise its presence, detect presence of other gearboxes and build up a topology of the gearbox cloud, distribute data and gears through the gearbox cloud, and more. The peer to peer component 314 may provide part of the functionality of the multi-master database system in some examples, by providing functionality to propagate data modifications between the gearboxes and for resolving any conflicts arising from concurrent changes made by different individual gearboxes of the gearbox cloud.

The gear dispatcher 316 comprises software to be executed at the processor 306 for deciding whether cached results can be used, sending requests to the next gearbox in the gearbox ring if capacity at the gearbox is reduced, and executing gears. An example method carried out at the gear dispatcher 316 is described with reference to FIG. 4.

Alternatively, or in addition, the functionality of a gearbox can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 4:
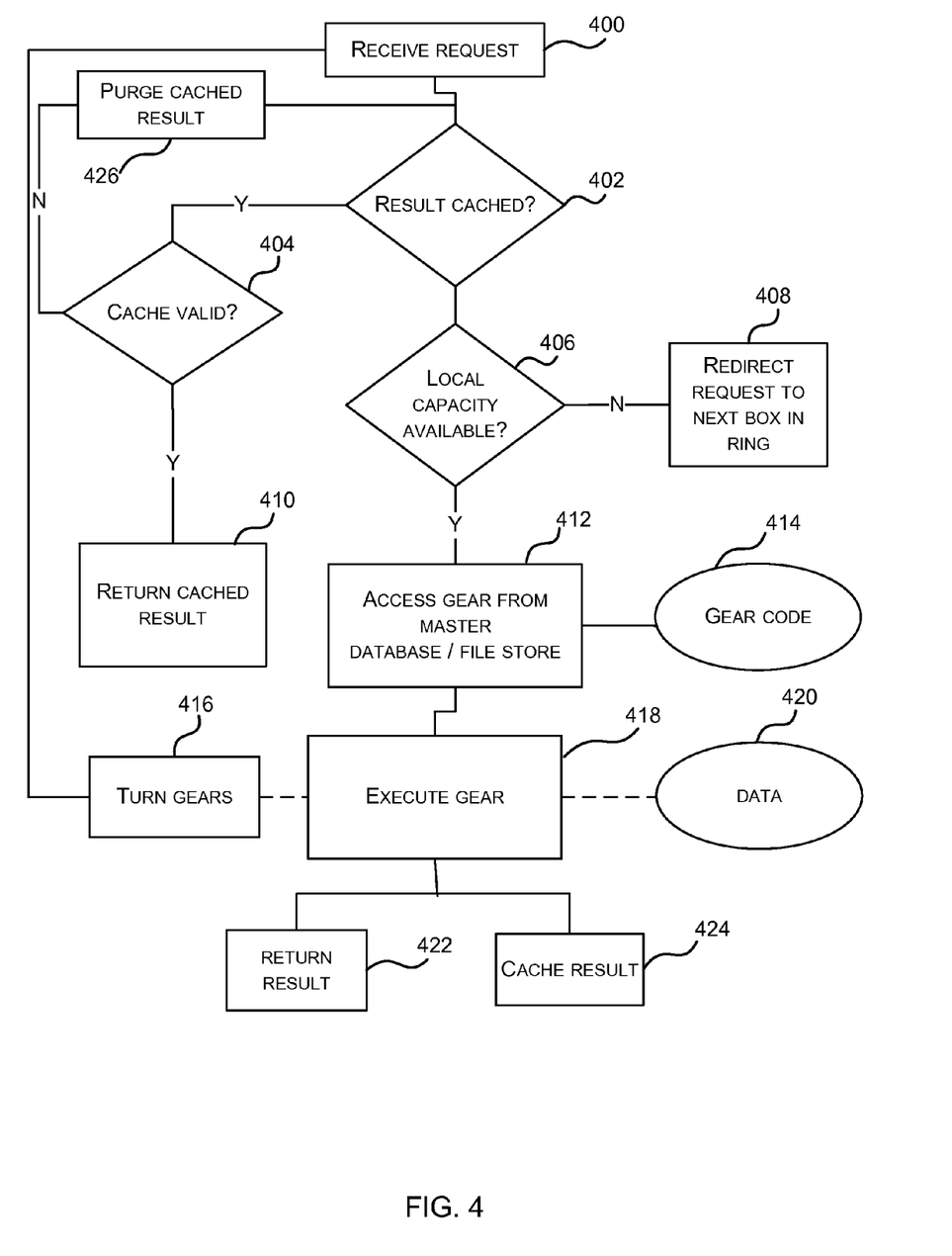
FIG. 4 is a flow diagram of a method at a gearbox.

FIG. 4 is a flow diagram of a method at a gear dispatcher of a gearbox. As mentioned above, consistent hashing may be used to improve efficiency. In this case, when a request is received by a gearbox from the round robin load balancer the request is hashed and the resulting hash code is used, as part of a consistent hashing scheme, to choose a gearbox to handle the request. The request is then redirected to the chosen gearbox and if this redirected request fails, the next gearbox in the ring is tried and so on until a gearbox with capacity is able to process the request. If no gearbox has capacity the request fails. In the example of FIG. 4 this initial process of choosing a gearbox using the hash code has already taken place. By using a consistent hashing scheme as part of the gearbox selection process in this way, a local cache efficiency for requests is achieved among a plurality of gearboxes.

Thus in FIG. 4 a request is received 400 either from another gearbox over the interconnect, or from the gearbox itself in the case that the hash code is used to select the gearbox itself. The request comprises input data (which may be in the form of a string), and an identifier of a gear. In some examples the request is a RESTful request which is a request according to the well-known Representational State Transfer architectural style. The request may originate from an end user computing device from which an end user is operating the web application. The request may be sent as a RESTful request using HTTP or HTTPS from the end user device (also referred to as a client device) to the cloud infrastructure.

The gearbox checks 402 whether an output for the gear identifier is already cached at its local cache. Even though only a local cache is checked, because of the use of the consistent hashing scheme to select which gearbox to send requests to (described above) it is possible to benefit from cached results stored at other gearboxes.

If the check at box 402 is successful, the gearbox checks 404 whether it is safe to use the locally cached result. This check comprises using knowledge of changes made at the physical storage of the gearbox. Because these checks are made using the local physical storage they can be made efficiently and quickly. If it is safe to use the cache, the appropriate output data is accessed from the local cache for the particular gear concerned, and the output is returned 410 from the gearbox to the client device (from which the request originated).

At check point 402, if there is no cached output for the gear specified in the request, the gearbox proceeds to check 406 whether it has capacity available locally to execute the gear. If not the gear dispatcher sends 408 a request to the next gearbox in the ring of gearboxes (where the ring of gearboxes comprises the order of gearboxes used by the round robin load balancer).

If there is available local capacity, the gearbox accesses 412 the gear code 414 from the master database (or from the master file store where this is available) at the physical storage of the gearbox. The gearbox executes 418 the accessed gear code in dependence on state from the physical store and this is illustrated in FIG. 4 using a dotted line to data 420. As part of this execution the gear can trigger execution of one or more other gears which is illustrated in FIG. 4 by box 416. A plurality of gears which are executed as a group in this way is referred to as a "clockwork". When a gear executes it does so in dependence on state from the physical storage (i.e. the multi-master database and optionally the multi-master file storage system). As gears in a clockwork turn one or more requests are generated so that the gearbox may receive more requests (at box 400) as illustrated in FIG. 4. After execution of a gear its result is cached 424. An output result 422 is returned to the requesting end user device.

Figure 5:
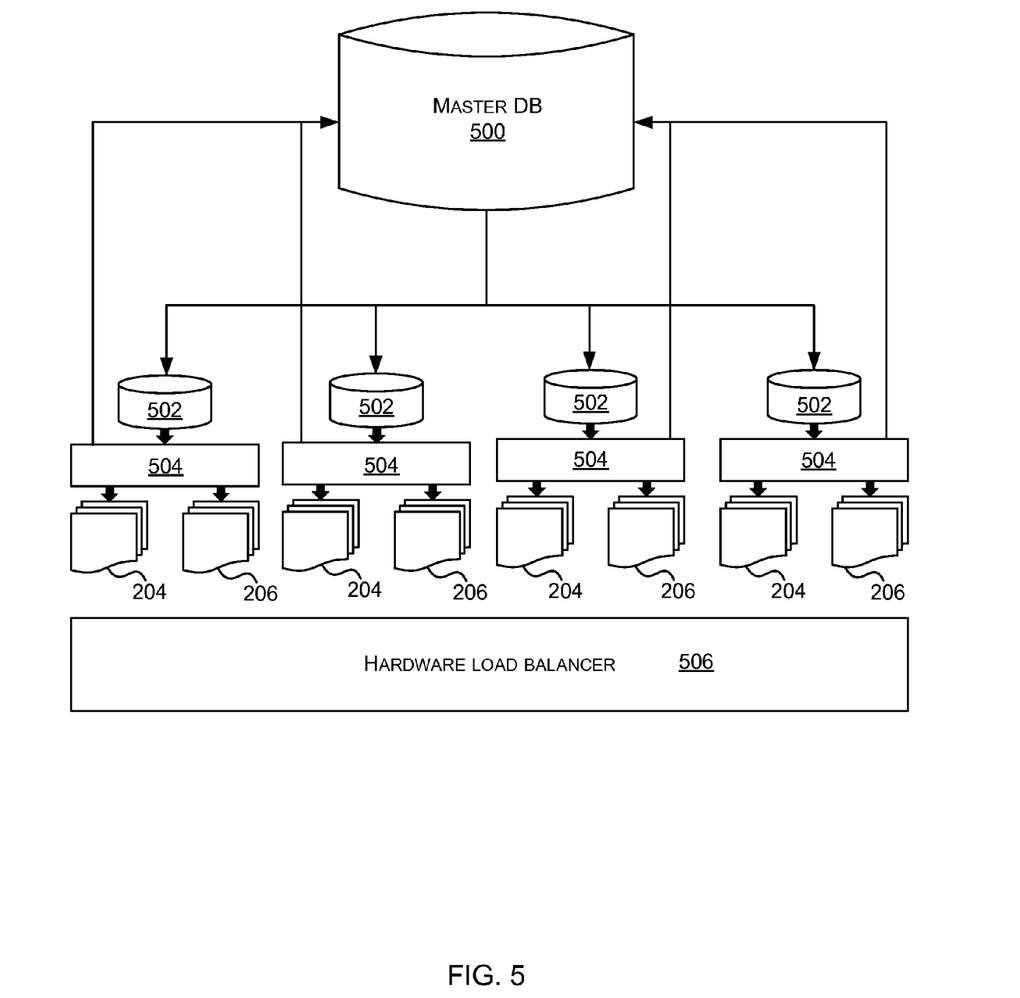
FIG. 5 is schematic diagram of a cloud computing infrastructure comprising a single master database deployment.

FIG. 5 is a schematic diagram of a cloud computing infrastructure comprising a master-slave database deployment having a single master database 500 which is replicated to a plurality of slave databases 502. The master-slave database deployment of FIG. 5 is described in order to aid understanding of the multi-master system of the present application. A plurality of web servers 504 have access to text 204 and media items 206. Each individual web server 504 is able to read from its local slave database 502 and writes to the master database 500 as indicated by the arrows in FIG. 5. A hardware load balancer 506 allocates incoming requests to appropriate ones of the web servers 504. By using a master database 500 the slave databases 502 in this arrangement are consistent with the master database 500. However, if one of the slave databases 504 fails, there is no fast and simple way to recover because the other slave databases do not know the data of the failed slave database and because only the slave databases are available for client interaction (not the master database).

Figure 6:
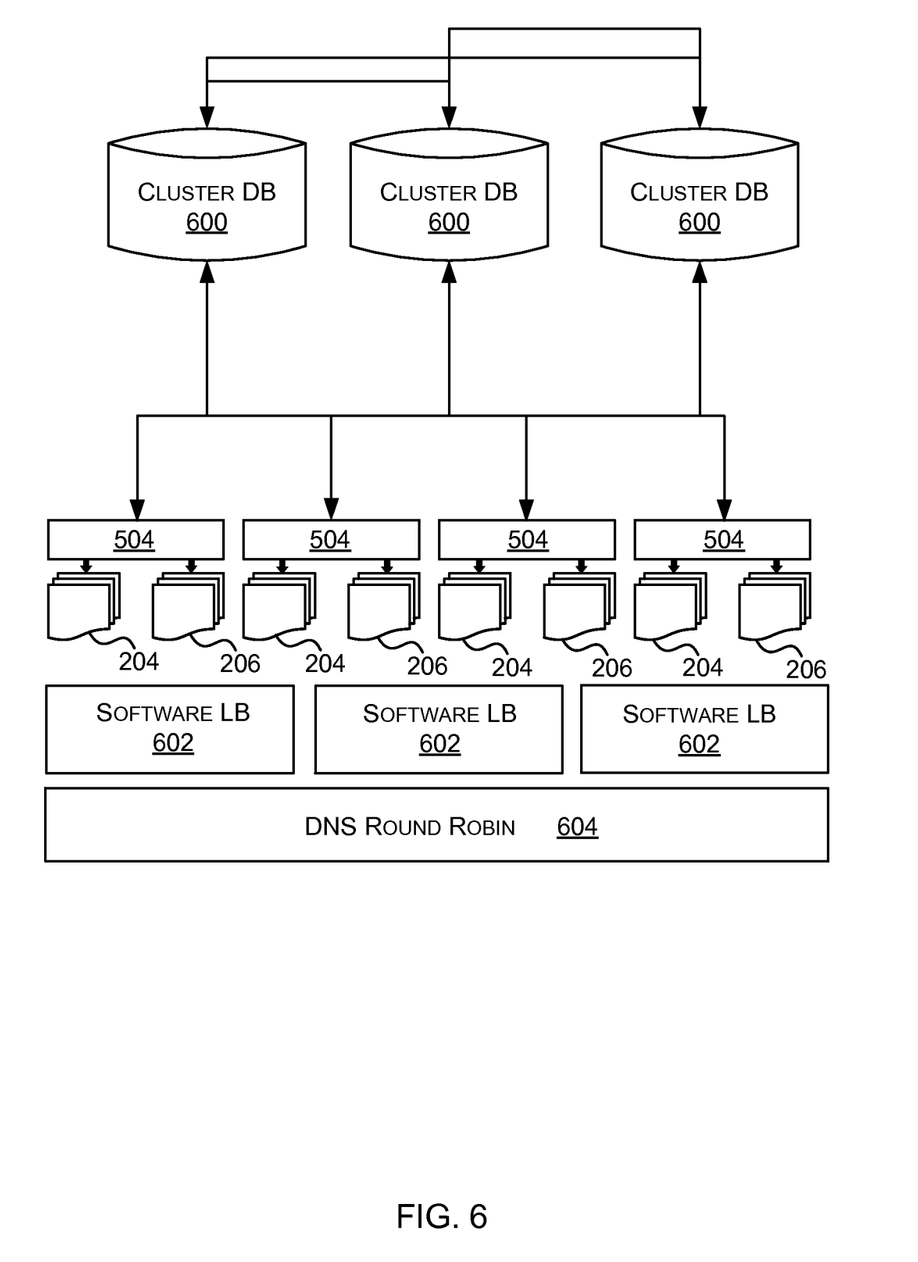
FIG. 6 is a schematic diagram of a cloud computing infrastructure comprising a multi-master database deployment.

FIG. 6 is a schematic diagram of a cloud computing infrastructure comprising a multi-master database deployment in which gearboxes are not used. This example is given to aid understanding of the technology described with reference to FIGS. 1 to 4 and 7. In FIG. 6 a plurality of web servers 504 read and write to a plurality of master databases 600. The master databases 600 are in communication with one another and update one another so as to be eventually consistent. In order to allocating incoming requests to the web servers 504, both a DNS round robin 604 and a plurality of software load balancers 602 are used to ensure sticky sessioning. In the arrangement of FIG. 6 more than four different types of technology are required to implement a web service. These include software for operating the multi-master database system, software for operating the web servers 504, software for operating the software load balancers 602, and software for operating the DNS round robin 604. This means that a software engineer, with the task of implementing a new web service, needs to be expert on each of the four technologies. Also, if there is an increase in demand and a new web server is added, it may be necessary to also add another master database and software load balancer. That is, the arrangement of FIG. 6 is not horizontally scalable.

A context-free grammar of the new programming language is given below:

```
<clockwork> -> 'clockwork' <identifier> '{' <gear-list> '}'
<gear-list> -> <gear> <gear-list> | <gear>
<gear> -> 'gear' <gear-identifier> '{' <expression-list> '}'
<gear-identifier> -> <string-literal> | <string> '<' <declaration-list> '>'
<declaration-list> -> <declaration> ',' <declaration-list> | <declaration> | <>
<rvalue-list> -> <rvalue> ',' <rvalue-list> | <rvalue>
<identifier-list> -> <identifier> ',' <identifier-list> | <identifier> | <>
<expression-list> -> <expression> <expression-list> | <expression> | <>
<lvalue> -> <declaration> | <index>
<declaration> -> <type> <identifier>
<type> -> 'int' | 'char' | 'double' | 'string' | 'bool'
<index> -> <info-index> | <array-index> | <hist-index>
<info-index> -> <identifier> '.' <string>
<array-index> -> <indentifier> '[' <arithmetic-operation> ']'
<hist-index> -> <identifier> '[' <rvalue> ']'
<identifier> -> <alpha><character-list>
<expression> -> <assignment> ';' | <turn> | <command> ';' | <range> | <conditional> | <structure> ';'
<assignment> -> <lvalue> '=' <rvalue>
<rvalue> -> <literal> | <operation> | <length> | <transform> | <identifier> | <index> | <rcommand>
<literal> -> <integer> | <character> | <double> | <string> | <boolean>
<integer> -> <digit-list>
<digit-list> -> <digit><digit-list> | <digit>
<digit> -> '0'-'9'
<character> -> '"' <letter> '"'
<letter> -> <alpha> | <digit>
<alpha> -> 'a'-'z' | 'A'-'Z'
<double> -> <digit-list> '.' <digit-list>
<string> -> '"' <character-list> '"'
<character-list> -> <character><character-list> | <character> | <>
<boolean> -> 'true' | 'false'
<operation> -> <arithmetic-operation> | <boolean-operation>
<boolean-operation> -> <boolean-operand> <boolean-operator> <boolean-operand> | '!' <boolean-operation> | <boolean-operand>
<boolean-operand> -> <identifier> | '(' <boolean-operation> ')' | <boolean>
<boolean-operator> -> '<' | '>' | '==' | '!=' | '<=' | '>=' | '&' | '|'
<arithmetic-operation> -> <arithmetic-operand> <arithmetic-operator> <arithmetic-operand> | '-' <arithmetic-operation> | <arithmetic-operand>
<arithmetic-operand> -> <identifier> | '(' <arithmetic-operation> ')' | <int> | <double>
<arithmetic-operator> -> '+' | '-' | '/' | '*'
<length> -> <identifier>'.' 'length'
<transform> -> <identifier> '=>' <type>
<rcommand> -> <connections> | <load> | <check> | <newkey> | <order> | <reverse> | <map> | <reduce> | <filter> | <top> | <bottom> | <pack> | <now> | <copy>
<connections> -> 'connections' 'of ' <string> 'by' <string> ['from' <rvalue> 'to' <rvalue>]
<load> -> 'load' <rvalue>
<check> -> 'check' <rvalue>
<newkey> -> 'newkey'
<map> -> 'map' <identifier> 'using' <identifier> '{' <expression-list> <return> '}'
<reduce> -> 'reduce' <identifier> 'to' <identifier> 'using' <identifier> '=' <rvalue> '{' <expression-list>  '}'
<order> -> 'order' <identifier> ['by' <identifier>];
<reverse> -> 'reverse' <identifier>
<filter> -> 'filter' <identifier> 'using' <identifier> '{' <expression-list>
```

-continued

```
<return> '}'
        <top> -> 'top' <identifier> ['limit' <count>]
        <pack> -> 'pack' <identifier>
        <now> -> 'now'
        <copy> -> 'copy' <identifier>
        <turn> -> 'turn' <identifier> '<' <rvalue-list> '>' '(' <declaration-list>
')' '{' <expression-list> '}'
        <command> -> <save> | <debug> |<connect> | <disconnect> |
<delete> | <merge> | <increment> | <await> | <return> | <clear>
        <save> -> 'save' <rvalue> 'to' <rvalue>
        <debug> -> 'debug' <rvalue>
        <connect> -> 'connect' <string> 'to' <string> 'with' <string>
        <disconnect> -> 'disconnect' <string> 'from' <string> 'with' <string>
        <delete> -> 'delete' <rvalue>
        <merge> -> 'merge' <identifier> 'with' <rvalue>
        <increment> -> 'increment' <identifier> 'at' <rvalue>
        <clear> -> 'clear' <identifier> 'at' <rvalue>
        <await> -> 'await' <identifier>
        <return> -> 'return' <rvalue-list>
        <range> -> <range-iterator> | <range-explicit>
        <range-iterator> -> 'range' '(' <identifier> 'in' <identifier> ')' '{'
<expression list> '}'
        <range-explicit> -> 'range' '(' <identifier> <range-definition> ')' '{'
<expression list> '}'
        <range-definition> -> 'from' <rvalue> 'to' <rvalue>
        <conditional> -> <conditional-list>
        <conditional-list> -> <if> 'else' <conditional-list> | <if> 'else' '{'
<expression-list> '}' | <if>
        <if> -> 'if' '(' <boolean-operation> ')' '{' <expression-list> '}'
        <structure> -> <array> | <hist> | <info>
        <array> -> 'array' '<' <type> '>' <identifier>
        <hist> -> 'hist' <identifier>
        <info> -> 'info' <identifier>
        template types: int, char, long, double, float, string i.e. only literals
        types: template types + arrays
        concurrent, threadsafe structures array and map
        no loops: ranges only
        range(char c in display)
```

A concept of "scratch" whereby files and objects can be downloaded to the local machine, manipulated there, and then uploaded back into the distributed store. Scratch version is used in preference to version in distributed store but is NOT permanent, i.e. is marked for sweep and clean.

```
        upload(ID)
        download(ID)
        vector is basically a super-tuple
        vector<char:2,int:10> x;
``` used to load/save data for manipulation by a gear from the memory or file store. Range must always be explicit.

```
        vector<int:10> data[ ] = load("data" from 0 to 10)
        save(data from 0 to 10 into "data")
``` used to print debug messages to a threadsafe virtual console debug("something here")
used to reduce on structures

```
        double sum = reduce values to total using x {
        results(total + x);
        }
``` used to map on structures

```
        double dvalues[ ] = map ivalues using x {
        results(x as double);
        }
```

```
        Ivalues.Map(o=>{
        return (Gdouble)o;
        });
```

An example of a web application written using the gears programming language is now given. This web application prints the characters of the string "Hello World" on the screen of a client device. It comprises a clockwork, which is a group of gears that execute in dependence on one another, and a gear which is called multiple times by the clockwork. Each time the gear is called it generates a character of the string "HelloWorld" and the characters are collected together and returned an an output string.

```
clockwork HelloWorld {
    gear HelloWorldCharacter<int order, char c>{
        return order,c;
    }
    gear HelloWorld<string display>{
        array<char> output;
        range(i from      0 to display.length){
            turn HelloWorldCharacter<i,display[i]>(int index, char c){
                output[index] = c;
            }
        }
        await HelloWorldCharacter;
        return output as string;
    }
}
```

In the above example a client sends the following REST request to the gearbox cloud:
http://gears.cloud.net/HelloWorld/
HelloWorld?display=Hello+World %21
The address of the gearbox cloud is gears.cloud.net, there is a clockwork called HelloWorld and a gear called HelloWorld. The arguments to the gear are display=Hello+World %21

When the gearbox cloud receives the request, the request is allocated to a gearbox by the round robin load balancer. The gearbox which receives the request accesses the gear called HelloWorld. This gear comprises the following code statements:

```
gear HelloWorld<string display>{
    array<char> output;
    range(i from 0 to display.length){
        turn HelloWorldCharacter<i,display[i]>(int index, char c){
            output[index] = c;
        }
    }
}
```

The gearbox executes the above code statements using display=Hello+World %21 as the argument<stringdisplay>.

An example of a dynamic web application for a social network is now given, written in the gears programming language. A gear called NewsFeed returns posts from your friends. This gear calls a gear called Posts which finds all posts for a given user. NewsFeed turns the Posts gear multiple times for the friends, collates the results and returns the output.

```
clockwork GearBook{
    gear AddUser<string email, string name>{
        bool exists = check email;
        if(exists){
            return "email already registered";
        }
        info user;
        user.id = newkey;
        user.email = email;
        user.name = name;
        save user to user.id;
        save email to email;
        connect email to user.id with "id";
    }
    gear GetUserID<string email>{
        array<string> id = connections of email by "id";
        if(id.length == 0){
            return "No user with that email";
        } else {
            return id[0];
        }
    }
    gear AddFriend<string id, string friendID>{
        connect id to friendID with "friend";
    }
    gear Friends<string id>{
        array<string> friendIDs = connections of id by "friend";
        return load friendIDs;
    }
clockwork GearBook{
    gear AddUser<string email, string name>{
        bool exists = check email;
        if(exists){
            return "email already registered";
        }
        info user;
        user.id = newkey;
        user.email = email;
        user.name = name;
        save user to user.id;
        save email to email;
        connect email to user.id with "id";
    }
    gear GetUserID<string email>{
        array<string> id = connections of email by "id";
        if(id.length == 0){
            return "No user with that email";
        } else {
            return id[0];
        }
    }
    gear AddFriend<string id, string friendID>{
        connect id to friendID with "friend";
    }
    gear Friends<string id>{
        array<string> friendIDs = connections of id by "friend";
        return load friendIDs;
    }
clockwork GearBook{
    gear AddUser<string email, string name>{
        bool exists = check email;
        if(exists){
            return "email already registered";
        }
        info user;
        user.id = newkey;
        user.email = email;
        user.name = name;
        save user to user.id;
        save email to email;
        connect email to user.id with "id";
    }
    gear GetUserID<string email>{
        array<string> id = connections of email by "id";
        if(id.length == 0){
            return "No user with that email";
        } else {
            return id[0];
        }
    }
    gear AddFriend<string id, string friendID>{
        connect id to friendID with "friend";
    }
    gear Friends<string id>{
        array<string> friendIDs = connections of id by "friend";
        return load friendIDs;
    }
}
```

Figure 7:
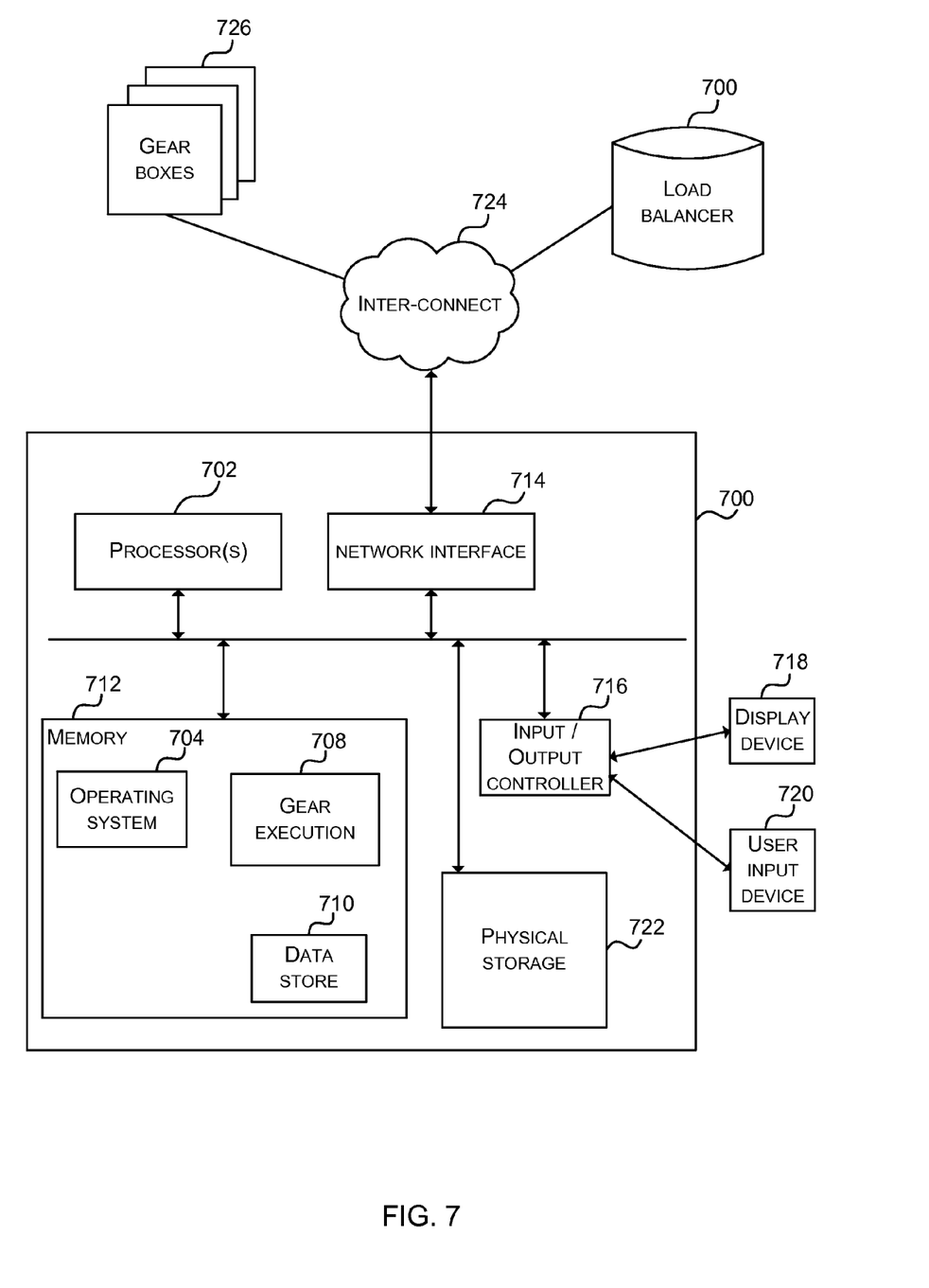
FIG. 7 illustrates an exemplary computing-based device in which embodiments of a gearbox may be implemented.

FIG. 7 illustrates various components of an exemplary computing-based device 700 which may be implemented as any form of a computing and/or electronic device, and in which embodiments of a gearbox may be implemented.

Computing-based device 700 comprises one or more processors 702 which may be microprocessors, controllers or any other suitable type of processors for processing computer executable instructions to control the operation of the device in order to receive requests specifying code statements referred to as gears, retrieve gears from physical storage 722 comprising a master database of a multi-master database system, execute gears in dependence on state from the multi-master database system, and return output to one or more client devices. In some examples, for example where a system on a chip architecture is used, the processors 702 may include one or more fixed function blocks (also referred to as accelerators) which implement a part of the method of FIG. 4 in hardware (rather than software or firmware). Platform software comprising an operating system 704 or any other suitable platform software may be provided at the computing-based device as well as a gear execution platform 708 to enable gears (atomic code statements written in a new programming language described herein) to be executed on the device. A data store 710 holds input data from requests received at the gearbox, output data generated by gears, and other data.

The computer executable instructions may be provided using any computer-readable media that is accessible by computing based device 700. Computer-readable media may include, for example, computer storage media such as memory 712 and communications media. Computer storage media, such as memory 712, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 712) is shown within the computing-based device 700 it will be appreciated that the storage may be distributed or located remotely and accessed via a network or other communication link (e.g. using network interface 714). Network interface 714 enables the computing-based device 700 to connect to interconnect 724 linking a plurality of gearboxes 726 and a load balancer 700.

The computing-based device 700 also comprises an input/output controller 716 arranged to output display information to a display device 718 which may be separate from or integral to the computing-based device 700. The display information may provide a graphical user interface. The input/output controller 716 is also arranged to receive and process input from one or more devices, such as a user input device 720 (e.g. a mouse, keyboard, camera, microphone or other sensor). In some examples the user input device 720 may detect voice input, user gestures or other user actions and may provide a natural user interface (NUI). This user input may be used to view configuration data of the gearbox, facilitate maintenance and updates to be controlled by an operator, and for other purposes. In an embodiment the display device 718 may also act as the user input device 720 if it is a touch sensitive display device. The input/output controller 716 may also output data to devices other than the display device.

In an example there is a first node of a cloud computing infrastructure supporting a dynamic web application, the first node comprising:

a web server comprising a network interface configured to connect the web server to a plurality of second nodes of the cloud computing infrastructure;

physical storage, connected to the web server, the physical storage comprising at least a master database of a multi-master database system of the cloud computing infrastructure, the master database configured to store atomic code units and data redundantly as part of the multi-master database system, the atomic code units defining the dynamic web application;

the web server arranged to receive requests comprising input data and identifiers of individual ones of the atomic code units, at least some of the requests originating from client devices using the dynamic web application; and the web server having a processor configured to execute, in response to requests, individual ones of the atomic code units in dependence on state of the master database, such that the dynamic web application is executed.

For example, the processor is arranged such that execution of individual ones of the atomic code units returns cacheable output data, which, for a given atomic code unit is output data that has only one possible value in the situation where the state of the physical storage does not change.

For example, the web server comprises a cache, and the processor is configured to cache an output of execution of one of the atomic code units using a cache key which comprises the request which triggered the execution of the atomic code unit.

For example the processor is configured to check whether it is safe to use results from the cache by checking the physical storage.

For example the web server comprises a peer to peer component arranged to communicate with the second nodes over the network interface to discover information about topology of the second nodes.

For example the processor is configured to hash one of the received requests to generate a hash code using a consistent hashing scheme, and to select one of the second nodes to send the request to on the basis of the hash code.

For example the first node is functionally equivalent with each of the second nodes such that to meet increased demand of the web application the cloud infrastructure is horizontally scalable by adding more first nodes without the need to add dedicated database nodes.

For example, the web server is configured to receive the requests from the at least one load balancer being a round robin load balancer.

For example, the physical storage comprises a master file store of a multi-master file storage system of the cloud computing infrastructure.

For example, the master database stores files and where the multi-master database system stores files as well as data in other forms.

For example, the physical storage holds the atomic code statements written in a programming language which is dedicated to creating dynamic web applications.

For example, the physical storage holds the atomic code statements written in a programming language which results in the atomic code statements, which together define the dynamic web application, being suitable for distributed execution on different ones of the first and second nodes.

For example, the processor is configured to execute one or more of the atomic codes statements as a result of those atomic code statements being called by execution of others of the atomic code statements.

For example, the web server is configured to receive the requests originating from the client devices in the form of RESTful requests over an HTTP or HTTPS connection between the client device and the load balancer.

For example, the web server is configured to receive the requests in a form comprising input data represented as a string.

An example provides a cloud computing infrastructure comprising:

a plurality of nodes in communication with one another over a network;

at least one load balancer configured to allocate incoming requests to the nodes;

a multi-master database system comprising a plurality of master databases, one at each of the plurality of nodes, the multi-master database system redundantly storing data and redundantly storing atomic code units defining a dynamic web application provided by the cloud computing infrastructure to a plurality of end user computing devices;

each node comprising:

a web server comprising a network interface configured to connect the web server to the at least one load balancer and also configured to connect the web server to the other nodes; and physical storage, connected to the web server, the physical storage comprising one of the master databases;

the web server having a processor configured to execute, in response to requests, individual ones of the atomic code units in dependence on state of the master database, to generate output data according to the dynamic web application.

In an example, the cloud computing infrastructure mentioned above comprises a multi-master file storage system.

In an example, the cloud computing infrastructure mentioned immediately above is such that the master databases of the multi-master database system together store a body of data, and where any of the master databases is allowed to update the body of data, and where any of the master databases is responsive to client data queries.

In an example, the multi-master database system has a mechanism to propagate data modifications made by one of the master databases, to the other master databases and to resolve any conflicts arising from concurrent changes made by different individual master databases of the cloud computing infrastructure.

In an example there is a method performed using a first node of a cloud computing infrastructure supporting a dynamic web application, the method comprising:

storing, at a master database of a multi-master database system of the cloud computing infrastructure, data and atomic code units, the atomic code units being part of a plurality of atomic code units redundantly distributed over a plurality of second nodes of the cloud computing infrastructure and which define the web application;

receiving requests comprising input data and identifiers of individual ones of the atomic code units, at least some of the requests originating from client devices using the web application; and executing, in response to the requests, individual ones of the atomic code units in dependence on state of the master database, such that the web application is executed.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A first node of a cloud computing infrastructure supporting a dynamic web application, the first node comprising:
   a web server comprising a network interface configured to connect the web server to a plurality of second nodes of the cloud computing infrastructure;
   physical storage, connected to the web server, the physical storage comprising at least a master database of a multi-master database system of the cloud computing infrastructure, the master database configured to store atomic code units and data redundantly as part of the multi-master database system, the atomic code units defining the dynamic web application;
   the web server arranged to receive requests comprising input data and identifiers of individual ones of the atomic code units, at least some of the requests originating from client devices using the dynamic web application; and
   the web server having a processor configured to execute, in response to requests, individual ones of the atomic code units in dependence on state of the master database, such that the dynamic web application is executed.

2. The first node of claim 1 wherein the processor is arranged such that execution of individual ones of the atomic code units returns cacheable output data, which, for a given atomic code unit is output data that has only one possible value in the situation where the state of the physical storage does not change.

3. The first node of claim 1 wherein the web server comprises a cache, and wherein the processor is configured to cache an output of execution of one of the atomic code units using a cache key which comprises the request which triggered the execution of the atomic code unit.

4. The first node of claim 3 wherein the processor is configured to check whether it is safe to use results from the cache by checking the physical storage.

5. The first node of claim 1 wherein the web server comprises a peer to peer component arranged to communicate with the second nodes over the network interface to discover information about topology of the second nodes.

6. The first node of claim 1 wherein the processor is configured to hash one of the received requests to generate a hash code using a consistent hashing scheme, and to select one of the second nodes to send the request to on the basis of the hash code.

7. The first node of claim 1 wherein the first node is functionally equivalent with each of the second nodes such that to meet increased demand of the web application the cloud infrastructure is horizontally scalable by adding more first nodes without the need to add dedicated database nodes.

8. The first node of claim 1 wherein the web server is configured to receive the requests from at least one load balancer being a round robin load balancer.

9. The first node of claim 1 wherein the physical storage comprises a master file store of a multi-master file storage system of the cloud computing infrastructure.

10. The first node of claim 1 wherein the master database stores files and where the multi-master database system stores files as well as data in other forms.

11. The first node of claim 1 wherein the physical storage holds the atomic code statements written in a programming language which is dedicated to creating dynamic web applications.

12. The first node of claim 1 wherein the physical storage holds the atomic code statements written in a programming language which results in the atomic code statements, which together define the dynamic web application, being suitable for distributed execution on different ones of the first and second nodes.

13. The first node of claim 1 wherein the processor is configured to execute one or more of the atomic codes statements as a result of those atomic code statements being called by execution of others of the atomic code statements.

14. The first node of claim 1 wherein the web server is configured to receive the requests originating from the client devices in the form of RESTful requests over an HTTP or HTTPS connection between the client device and the load balancer.

15. The first node of claim 1 wherein the web server is configured to receive the requests in a form comprising input data represented as a string.

16. A cloud computing infrastructure comprising:
   a plurality of nodes in communication with one another over a network;
   at least one load balancer configured to allocate incoming requests to the nodes;
   a multi-master database system comprising a plurality of master databases, one at each of the plurality of nodes, the multi-master database system redundantly storing data and redundantly storing atomic code units defining a dynamic web application provided by the cloud computing infrastructure to a plurality of end user computing devices;
   each node comprising:
      a web server comprising a network interface configured to connect the web server to the at least one load balancer and also configured to connect the web server to the other nodes; and
      physical storage, connected to the web server, the physical storage comprising one of the master databases;
      the web server having a processor configured to execute, in response to requests, individual ones of the atomic code units in dependence on state of the master database, to generate output data according to the dynamic web application.

17. The cloud computing infrastructure of claim 16 comprising a multi-master file storage system.

18. The cloud computing infrastructure of claim 16 wherein the master databases of the multi-master database system together store a body of data, and where any of the master databases is allowed to update the body of data, and where any of the master databases is responsive to client data queries.

19. The cloud computing infrastructure of claim 16 wherein the multi-master database system has a mechanism to propagate data modifications made by one of the master databases, to the other master databases and to resolve any conflicts arising from concurrent changes made by different individual master databases of the cloud computing infrastructure.

20. A method performed using a first node of a cloud computing infrastructure supporting a dynamic web application, the method comprising:
   storing, at a master database of a multi-master database system of the cloud computing infrastructure, data and atomic code units, the atomic code units being part of a plurality of atomic code units redundantly distributed over a plurality of second nodes of the cloud computing infrastructure and which define the web application;

receiving requests comprising input data and identifiers of individual ones of the atomic code units, at least some of the requests originating from client devices using the web application; and executing, in response to the requests, individual ones of the atomic code units in dependence on state of the master database, such that the web application is executed.

\* \* \* \* \*